United States Patent [19]

Mishiro

[11] Patent Number: 4,483,571

[45] Date of Patent: Nov. 20, 1984

[54] ULTRASONIC PROCESSING DEVICE

[75] Inventor: Shoji Mishiro, Kawasaki, Japan

[73] Assignee: Tage Electric Co., Ltd., Tokyo, Japan

[21] Appl. No.: 491,803

[22] Filed: May 5, 1983

[30] Foreign Application Priority Data

May 12, 1982 [JP] Japan ................................. 57-79774

[51] Int. Cl.³ ........................................... H01L 41/08
[52] U.S. Cl. .................................. 310/323; 310/325;
74/1 SS; 68/3 SS; 366/127; 134/184
[58] Field of Search ............... 68/3 SS; 310/323, 328,
310/325; 366/127; 134/1, 184; 74/1 SS

[56] References Cited

U.S. PATENT DOCUMENTS

| 2,704,333 | 3/1955 | Calosi et al. | 310/26 |
| 3,113,225 | 12/1963 | Kleesattel et al. | 310/323 X |
| 3,141,100 | 7/1964 | Hart | 310/323 |
| 3,601,084 | 8/1971 | Biro | 310/323 X |
| 3,830,098 | 8/1974 | Antonevich | 73/579 |
| 4,110,654 | 8/1978 | Paul | 310/323 |
| 4,275,363 | 6/1981 | Mishiro et al. | 310/316 X |
| 4,315,181 | 2/1982 | Holze, Jr. | 310/323 |
| 4,363,992 | 12/1982 | Holze, Jr. | 310/323 |

FOREIGN PATENT DOCUMENTS 262529  5/1970  U.S.S.R. .................................. 134/1
557826  6/1977  U.S.S.R. .............................. 366/127

Primary Examiner—Philip R. Coe
Assistant Examiner—Frankie L. Stinson
Attorney, Agent, or Firm—Oblon, Fisher, Spivak, McClelland & Maier

[57] ABSTRACT

The present invention provides an ultrasonic processing device which comprises one or more sets each including a wide horn which resonantly vibrates in a ½ wave length in a longitudinal direction and in a ½×n wave length in a widthwise direction thereof, and an ultrasonic vibrator which is joined either to an intermediate point of the wide horn at which amplitude of vibrations is maximum in the distribution thereof along the widthwise direction or to a point at a widthwise end of the wide horn at which amplitude of vibrations is maximum in the distribution thereof along the widthwise direction. Thus, at an end of the wide horn, maximum and minimum values may alternately appear by every ¼ wave length distance over the entire width thereof and hence vibrations of the wide horn can be considered generally uniform over the entire width thereof. Also, wide horns in a plurality of sets may be disposed in spaced relationship in a direction in which an article to be processed is fed in order to attain further uniformed application of vibrations to the article to be processed.

8 Claims, 5 Drawing Figures

ULTRASONIC PROCESSING DEVICE

FIELD OF THE INVENTION

This invention relates to an ultrasonic processing device suitable for use, for example, with a washing apparatus for washing cloth and so on.

OBJECT OF THE INVENTION

It is an object of the present invention to provide an ultrasonic processing device which can generate ultrasonic vibrations uniformly over the entire width of an end of a wide horn thereof.

DESCRIPTION OF THE PRIOR ART

Figure 1:
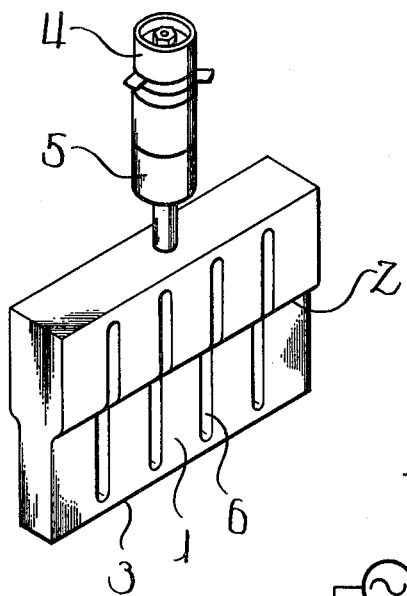
FIG. 1 is a perspective view showing an example of a conventional ultrasonic processing device.

Conventionally, processing devices wherein energy of cavitations obtained by application of strong ultrasonic vibrations are widely used in the industrial field, for example, for washing apparatus and the like. Particularly in washing apparatus and the like, it is required to generate strong vibrations over a great width to effect an intended processing. For example, it is not effective to pass cloth through a conventional ultrasonic washing tank in order to effect processings of the cloth such as washing, dyeing, destarching and scouring, since vibrations are not sufficiently strong to have an effect on the interior of the cloth. Accordingly, it has been necessary to use a wide vibratory member wherein vibrations of a vibrator is magnified in amplitude and concentrated by an amplitude magnifying horn so as to generate strong vibrations at an end thereof. To this end, a known device has been proposed which has a structure as shown in FIG. 1. In particular, a wide horn 1 has a stepped portion 2 which acts to magnify the amplitude of vibrations so that strong or intense vibrations may be generated at an end 3 of the horn 1. Joined to the center of the opposite end of the horn 1 is a magnifying horn 5 which has a vibrator 4 connected thereto. A plurality of slits 6 are formed in a row in a widthwise direction in the wide horn 1 and extend each in a direction along the axis of the vibrator 4, that is, in the direction of vibrations between portions of the wide horn 1 adjacent loops at opposite ends of the horn 1 such that interference in the widthwise direction between adjacent nodes which produce maximum stresses at portions of the wide horn 1 upon vibration may be prevented to allow resonant vibrations of the wide horn 1 and uniform vibrations may be attained over the entire width of the end 3 of the wide horn 1. In particular, during resonant vibration of the wide horn 1 in the longitudinal direction, distribution of the stress in the wide horn 1 by its vibration is such that the stress is maximum adjacent the stepped portions 2 where nodes will appear while it decreases gradually towards the opposite ends of the wide horn 1. Vibrations of the wide horn 1 will also be caused, although weak, in proportion to such distribution of the stress but in a direction perpendicular to the direction of the original vibrations. As a result, resonance will appear in directions other than the longitudinal direction due to interference of such possible secondary vibrations in the widthwise direction, resulting in failure to attain uniform vibrations at the end 3 of the wide horn 1. Thus, the slits 6 are formed in the wide horn 1 in order to eliminate such a disadvantageous condition.

Thus, the slits 6 have an important function to prevent interference due to vibrations of the wide horn 1 in the widthwise direction. In the meantime, however, the slits 6 cannot be extended sufficiently to the loops at opposite ends of the wide horn 1 since transmission of ultrasonic energy in the widthwise direction is required. As a result, it is impossible to completely eliminate interference of vibrations in the widthwise direction, and thus, the width of the end 3 of the wide horn 1 which assures uniform vibrations will be limited accordingly.

DESCRIPTION OF THE PREFERRED EMBODIMENTS

A first embodiment of the present invention will be described with reference to FIG. 2. A wide horn 7 is generally in the form of a rectangular parallelepiped having a first end 8 and an opposite second end 9 and is designed to allow resonant vibrations in a $\frac{1}{2}$ wave length in the longitudinal direction and a $\frac{1}{2} \times 6$ wave length, that is, a 3 wave length, in the widthwise direction. Three sets of ultrasonic vibrators 10 and magnifying horns 11 are joined to those points of the wide horn 7 at which amplitude of vibrations will be maximum in the distribution thereof in the widthwise direction. An ultrasonic power source 12 is connected to the ultrasonic vibrators 10.

Figure 2:
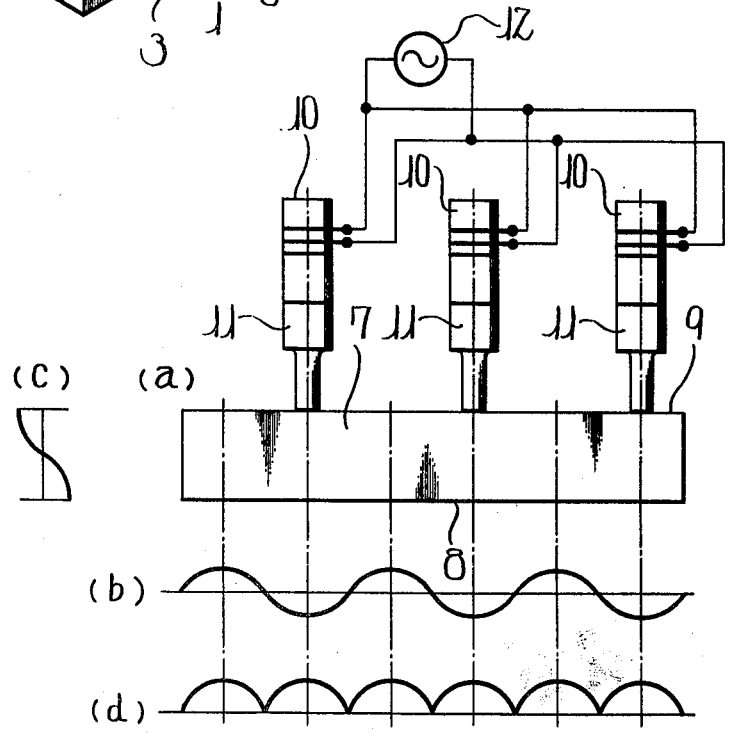
FIG. 2 is a front elevational view, in diagrammatic representation, showing a first embodiment of an ultrasonic processing device of the present invention.

In this construction, vibrations of the wide horn 7 in the longitudinal direction when the ultrasonic vibrator 10 is actuated are in a $\frac{1}{2}$ wave length as shown in (c) of FIG. 2 while the amplitude of an axial component of vibrations of the first end 8 of the horn 7 will vary as shown in (b) of FIG. 2. Accordingly, the amplitude will be maximum but in the reverse phases at positions displaced a distance corresponding to a $\frac{1}{2}$ wave length in the widthwise direction while it will be reduced to zero at locations displaced a distance corresponding to a $\frac{1}{4}$ wave length from each of the maximum amplitude positions. As a result, the distribution of the strength of vibrations along the end 8 of the wide horn 7 will be such that maximum and minimum values appear by each $\frac{1}{4}$ wave length distance as shown in (d) of FIG. 2.

It is to be noted that, while description has been given of the embodiment which includes up to three sets of ultrasonic vibrators 10 and magnifying horns 11, only one such set may otherwise be enough to vibrate the entire area of the wide horn 7 in the widthwise direction where less ultrasonic energy is required for an intended processing.

On the contrary, where higher energy is necessary, an additional set of the ultrasonic vibrator 10 and the magnifying horn 11 may be provided at a position displaced a $\frac{1}{2}$ wave length distance in the widthwise direction from an actuating point of the wide horn 7 as shown in (a) of FIG. 2 and may be actuated in the reverse phase.

Figure 3:
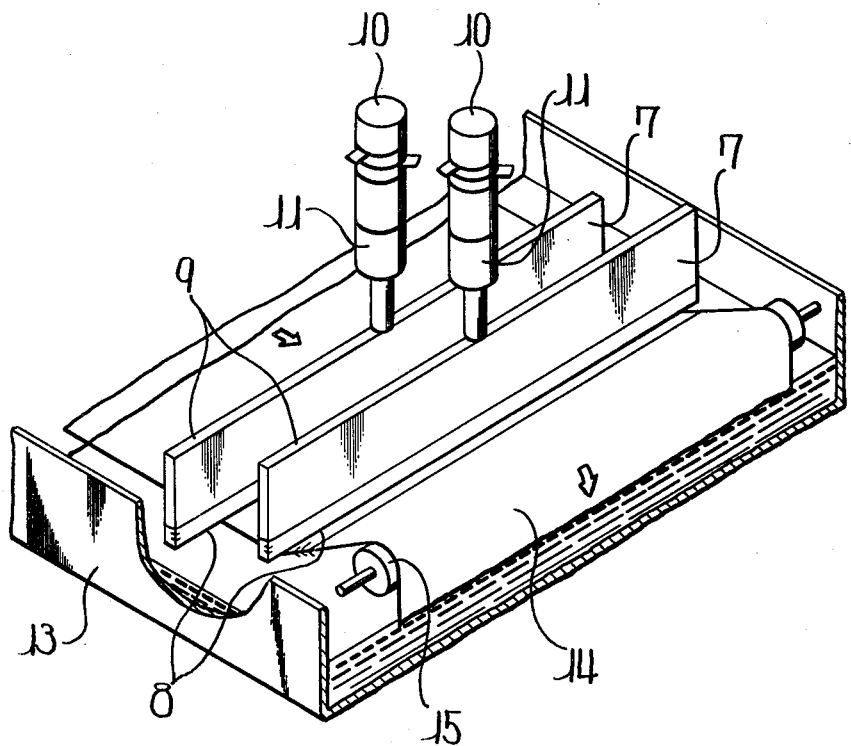
FIG. 3 is a perspective view, partly in section, showing a second embodiment of the invention.

Now, a second embodiment of the invention will be described with reference to FIGS. 3 and 4. It is to be mentioned that like parts to those of the first embodiment are designated by like reference numerals and further discription thereof are omitted herein. In the present embodiment, a wide horn 7 has only one set of an ultrasonic vibrator 10 and a magnifying horn 11 assembled thereto, and the embodiment includes two such assemblies therein. In particular, an article 14 to be processed in a vessel 13 is in the form of a web of a predetermined width and is contacted with a roller 15 so as to be fed in a direction of an arrow mark. Thus, the two wide horns 7 are disposed in spaced relationship along the feeding direction of the article 14 to be processed and in a displaced relationship by a ¼ wave length distance in a direction perpendicular to the feeding direction.

Figure 4:
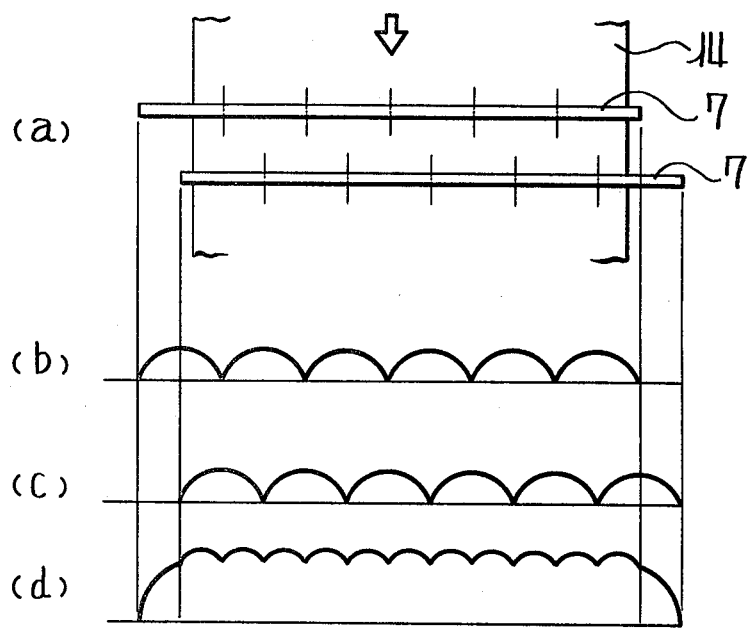
FIG. 4 is a front elevational view, in diagrammatic representation, of the device of FIG. 3.

(b) and (c) of FIG. 4 individually show, similarly to (d) of FIG. 2, distributions of the strength of vibrations of the wide horns 7 in the widthwise directions in the construction as described above. Thus, the article 14 to be processed is first processed under the first wide horn 7 and then processed under the second wide horn 7. As a result, the article 14 is equivalently subject totally to a processing as seen in (d) of FIG. 4 under the influence of the distributions of the strength of vibrations of the first and second wide horns 7, and thus the article 14 is processed substantially uniformly over the entire width thereof.

It is to be noted that, while description has been just given of the embodiment which includes the two wide horns 7 disposed in displaced relationship by a ¼ wave length distance, it may otherwise be possible, if necessary, to provide three wide horns 7 disposed in displaced relationship by a 1/6 wave length distance. In this modified form, the total distribution of the strength of vibrations in the widthwise direction will be further uniformed to eliminate local unevenness of processing.

Such constructions of an ultrasonic processing device as in the embodiments described above will enable processing of a very wide article. For example, in a conventional device in which the ultrasonic frequency is 28 kHz, the maximum width which assures substantially uniform amplitude in mass production is about 30 cm. But, such construction as of the embodiments eliminates slits in conventional devices thereby to prevent attenuation of ultrasonic energy in the widthwise direction so that even a wide horn 7 of 1 m in width can sufficiently actuate an article.

Figure 5:
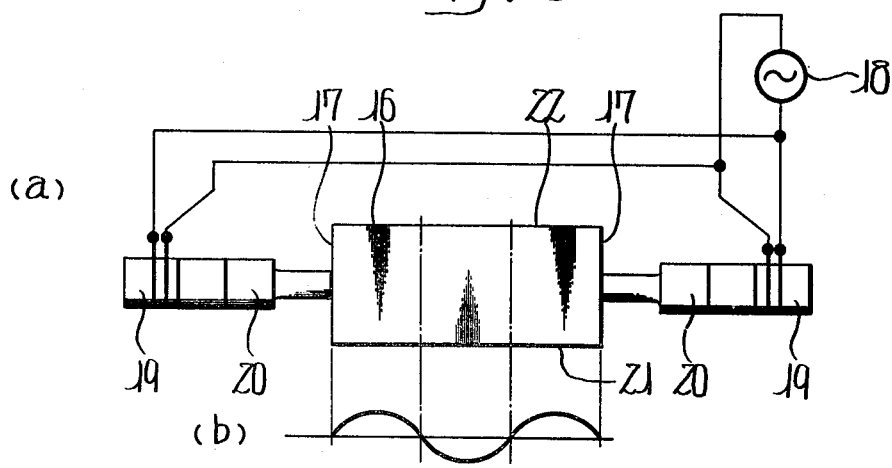
FIG. 5 is a front elevational view, in diagrammatic representation, of a third embodiment of the invention.

A third embodiment of the invention will now be described with reference to FIG. 5. A wide horn 16 of the present embodiment is designed to attain resonant vibration in a 1+½ wave length in the widthwise direction and in a ½ wave length in a direction perpendicular to the widthwise direction. The wide horn 16 is joined at each of opposite widthwise ends 17 thereof to a set of an ultrasonic vibrator 19 connected to an ultrasonic power source 18 and a magnifying horn 20 in order that it may be actuated thereby. The distribution of amplitude of vibrations along one end 21 and the other end 22 of the wide horn 16 may be such as seen in (b) of FIG. 5. This is similar to that as shown in (b) of FIG. 2. But, according to the present embodiment, not only the one end 21 but also the other end 22 of the wide horn 20 can be used as an ultrasonic energy radiating face.

Further, in practice, it is an alternative to use, instead of two sets of ultrasonic vibrators 19, only one such set which is joined to only one end 17 of the wide horn 16 for actuation thereof. It may also be possible to arrange a plurality of such sets in displaced relationship in the widthwise direction as shown in FIGS. 3 and 4.

As apparent from the foregoing description, according to the present invention, a wide horn which can produce resonant vibrations in a ½ wave length in the longitudinal direction and in a ½×n wave length in the widthwise direction has an ultrasonic vibrator joined either to an intermediate point thereof at which amplitude of vibrations is maximum in the distribution thereof along the widthwise direction or to a point at a widthwide end of the wide horn at which amplitude of vibrations is maximum in the distribution thereof along the longitudinal direction. As a result, vibrations can be produced uniformly over the entire width of the wide horn. Besides, since the wide horn has no slit formed therein, ultrasonic energy can be effectively transmitted in the widthwise direction, thereby facilitating uniform vibration over a very large widthwise dimension of the wide horn. Moreover, an arrangement of a plurality of sets of wide horns in displaced relationship in the widthwise direction could assure uniform processing of an article over the entire width thereof.

What is claimed is:

1. An ultrasonic processing device, comprising:
an ultrasonic vibrator which resonantly vibrates in an axial direction thereof; and
an unslotted wide horn which resonantly vibrates in a ½ wave length in a longitudinal direction and in a ½×n wave length (where n is an integer) in a widthwise direction thereof;
said ultrasonic vibrator being joined to a point of said wide horn at which amplitude of vibrations is maximum in the distribution thereof along the widthwise direction.

2. An ultrasonic processing device according to claim 1, comprising a plurality of such ultrasonic vibrators which are joined to some of a plurality of points of said wide horn at which amplitude of vibrations is maximum in the distribution thereof along the widthwise direction.

3. An ultrasonic processing device according to claim 1, comprising a plurality of such ultrasonic vibrators which are joined to a plurality of points of said wide horn spaced from each other by a wave length distance at which amplitude of vibrations is maximum in the distribution thereof along the widthwise direction, said ultrasonic vibrators being actuated in the same phase.

4. An ultrasonic processing device according to claim 1, comprising a plurality of such ultrasonic vibrators which are joined to a plurality of points of said wide horn spaced from each other by a ½ wave length distance at which amplitude of vibrations is maximum in the distribution thereof along the widthwise direction, adjacent ones of said ultrasonic vibrators being actuated in the reverse phases.

5. An ultrasonic processing device, comprising:
an ultrasonic vibrator which resonantly vibrates in an axial direction thereof; and
an unslotted wide horn which resonantly vibrates in a ½ wave length in a longitudinal direction and in a ½×n wave length (where n is an integer) in a widthwise direction thereof;
said ultrasonic vibrator being joined to a width wise end of said wide horn at which amplitude of vibrations is maximum in the distribution thereof along the widthwise direction.

6. An ultrasonic processing device according to claim 5, comprising a pair of such ultrasonic vibrators joined to opposite ends of said wide horn in the widthwise direction.

7. An ultrasonic processing device according to claim 5, wherein said ultrasonic vibrator is joined only to one end of said wide horn in the widthwise direction.

8. An ultrasonic processing device, comprising a plurality of sets each including an ultrasonic vibrator which resonantly vibrates in an axial direction thereof and a wide unslotted horn which is actuated to resonantly vibrate in a $\frac{1}{2}$ wave length in a longitudinal direction and in a $\frac{1}{2} \times n$ wave length (where n is an integer) in a widthwise direction thereof, said sets of ultrasonic vibrators and wide horns being disposed in spaced relationship in a direction in which an article to be processed is fed and in displaced relationship by a $\frac{1}{2}N$ wave (where N is a number of sets of said ultrasonic vibrators) length distance in the widthwise direction.

* * * * *